J. DREXLER.
SOFT COLLAR FASTENER.
APPLICATION FILED FEB. 28, 1922.
1,434,533.  Patented Nov. 7, 1922.
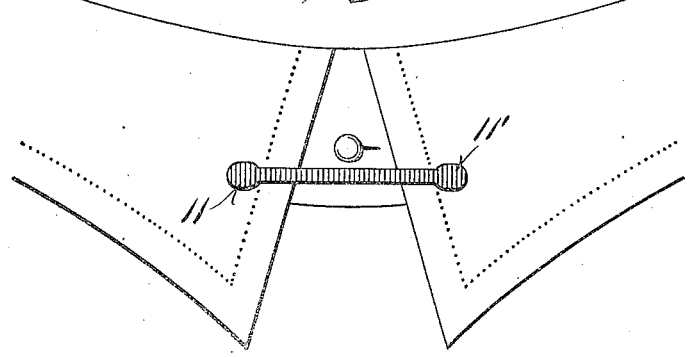
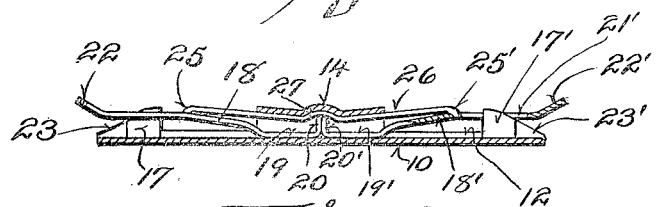
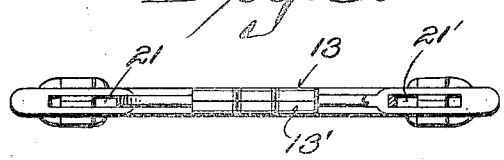
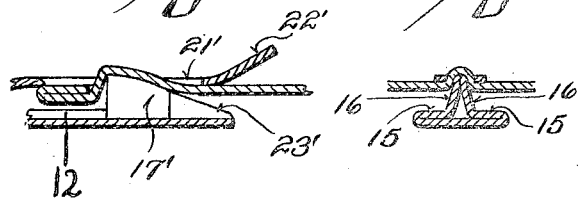  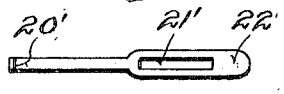
Inventor
John Drexler Patented Nov. 7, 1922.

1,434,533

UNITED STATES PATENT OFFICE.

JOHN DREXLER, OF MILWAUKEE, WISCONSIN.

SOFT-COLLAR FASTENER.

Application filed February 28, 1922. Serial No. 539,879.

*To all whom it may concern:*

Be it known that I, JOHN DREXLER, a citizen of the United States, and resident of Milwaukee, in the county of Milwaukee and State of Wisconsin, have invented certain new and useful Improvements in Soft-Collar Fasteners; and I do hereby declare that the following is a full, clear, and exact description thereof.

The invention relates to devices for fastening together the soft ends of a collar adjacent the tie space.

It comprises a plate, a dog on each end, a pair of slotted springs, cooperating with the dog and having their ends deflected so as to readily receive the ends of a collar and retain them in engagement with the dogs, and a reinforcing spring for exerting the tension on the slotted retainers and operating thereon to hold the collar securely in position but preventing the wrinkling of the collar.

The primary object of the invention is readiness of affixation of the device to the collar, the ends of the slotted retainers being deflected and cooperating with cammed edges of dogs in such wise as to readily permit the insertion of the edge of the collar. This operation does not call for special manipulation by the hand, but the mere urging of the fabric between the inclined surfaces, the play of the retainer relatively to the front plate facilitating the insertion.

An object is the securing of the edges of the collar in such wise as to prevent their tearing loose. Yet the device does not operate to wrinkle the material, the tendency of the retainers to clamp down upon the cloth being checked by a reinforcing spring which is on top and engages in the slot. The un-wrinkled appearance of the collar is very important and the general neatness is accentuated by the shape of the plate. the ends of which are slightly enlarged. The parts operating to retain the collar are concealed by the front plate.

An important feature is the ease of release of the fastener, the resiliency of the slotted retainers permitting the ready withdrawal on unusual tension of the fabric, yet not operating to abrade, tear, or otherwise mutilate the goods.

Other objects of the invention are strength and durability of parts, positiveness of fastening operation, the reinforcing spring contributing particularly to the exertion of a desired amount of pressure, simplicity of construction and ease of manufacture, the device being made of a minimum number of parts.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which:

Figure 1 is a front view of the device as applied to a collar.

Figure 2 is a horizontal sectional view therethrough.

Figure 3 is a rear elevation.

Figures 4, 5 and 6 are details.

Front plate 10 has enlargements 11—11' at its ends, for the purpose of enhancing neatness of appearance, and is provided with longitudinal strengthening ribs 12. Bracing members 13—13' are upwardly and then inwardly directed to contact with each other, and provided with a central deformation 14 for purposes presently to be explained. On the inner faces of the ends of front plate 10, folds 15—15' in extensions of the metal are produced, from which extensions 16—16' are inwardly directed, forming dogs 17—17'. Springs 18—18' have flattened portions 19—19' adapted to contact with the inner faces of front plate 10, and at right angles thereto, are arms 20—20', inwardly extending. Retainers 18—18' are provided with slots 21—21', adjacent laterally directed ends 22—22', the slots, as shown in Figure 2, being adapted to receive dogs 17—17'. Adjacent the dogs, extensions 16—16' are tapered downwardly, forming cams 23—23' for the purpose of cooperating with the edge of the collar as it is being introduced and directing it so as to be readily positioned over dogs 17—17', and retained between them and springs 18—18', the ends 22—22' also serving to facilitate the centering of the fabric and tending to separate the parts for the introduction of the material to a point immediately beyond dogs 17—17', as shown in Figure 4, wherein the hem 24 is gripped by dog 17' and prevented from retraction. The exertion of sufficient rearward pressure, however, as is obvious, will permit the withdrawal of the cloth, the retainers expanding for this purpose.

While retainers 18—18' are tensioned to maintain a desired gripping action, the wrinkling of the collar is prevented through the operation of catches 25—25' extending through slots 21—21', and preventing retainers 18—18' from moving apart laterally. Catches 25—25' are integral with spring 26 which serves to reinforce the action of retainers 18—18', so that a desired amount of spring action results, catches 25—25' operating, as described, to limit the lateral movement of retainers 18—18', as the result of this action. Spring 26 has a deformation 27 therein, received in deformation 14, and contacting with arms 20—20'. The deformation 27 assists in securing retainers 18—18' in place, as does also spring 26.

I claim:

1. In a soft collar fastener, the combination of a plate, a dog thereon, a spring having a slot therein, adapted to cooperate with said dog to retain a collar, and means for securing said spring and said plate in cooperative relation.

2. The combination of a plate, a dog rigid therewith, a cam adjacent said dog, a retainer having a deflected end and a slot adjacent thereto, said cam and said end cooperating for the centering of the collar edge, said dog cooperating with said slotted retainers to retain said collar, and means for securing said spring in cooperative relation to said plate.

3. The combination of a front plate, a dog secured thereto, a retainer having a slot therein for the reception of said dog, a spring, means on said spring to limit the lateral movement of said retainer, and means for securing said plate, said retainer and said spring in cooperative relation.

4. The combination of a front plate, a pair of dogs thereon, a plurality of slotted retainers having a flat portion contacting with said plate, and ends angularly directed from said flat portion, a spring, means on said spring cooperating with said retainers for limiting the lateral movement thereof, and means cooperating with said angularly directed ends and said spring for securing said plate, said retainers and said spring in cooperative relation.

In testimony that I claim the foregoing I have hereunto set my hand at Milwaukee, in the county of Milwaukee and State of Wisconsin.

JOHN DREXLER.